No. 684,305. Patented Oct. 8, 1901.
A. PFUND.
ROPE TIGHTENING DEVICE.
(Application filed Feb. 9, 1901.)
(No Model.)
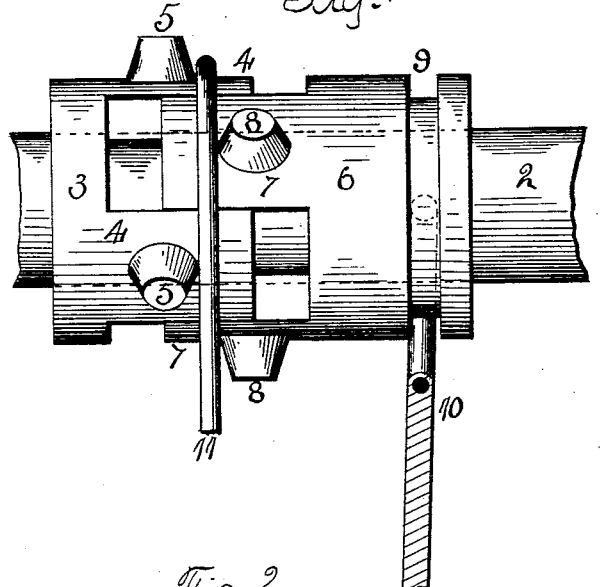
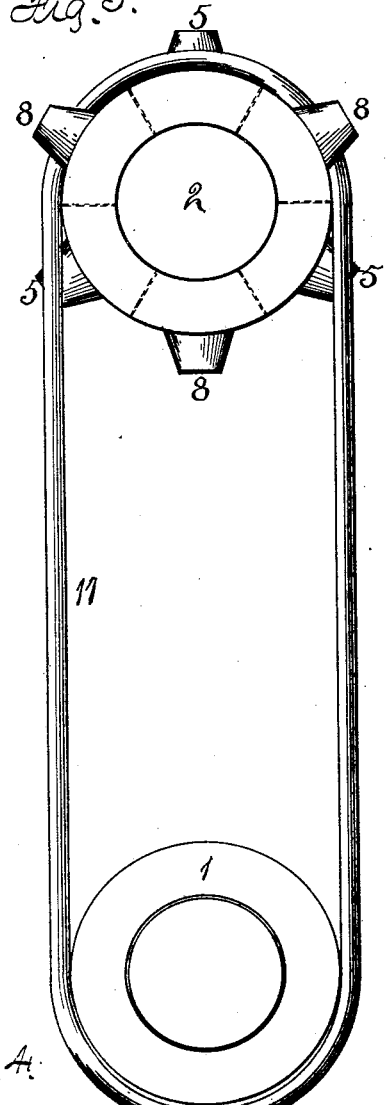
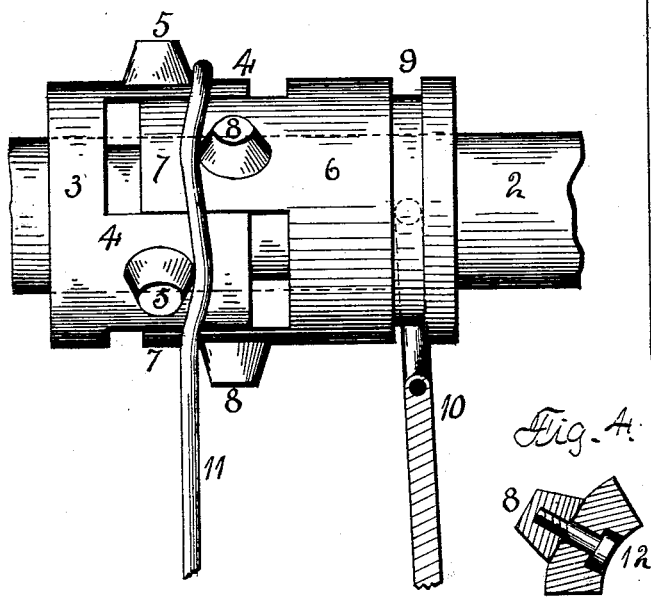
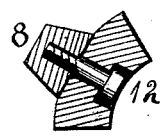
Witnesses:
J. P. Taylor
J. E. Behel
Inventor:
Adolph Pfund
By A. O. Behel
Atty.

UNITED STATES PATENT OFFICE.

ADOLPH PFUND, OF BELVIDERE, ILLINOIS.

ROPE-TIGHTENING DEVICE.

SPECIFICATION forming part of Letters Patent No. 684,305, dated October 8, 1901.

Application filed February 9, 1901. Serial No. 46,728. (No model.)

*To all whom it may concern:*

Be it known that I, ADOLPH PFUND, a citizen of the United States, residing at Belvidere, in the county of Boone and State of Illinois, have invented certain new and useful Improvements in Rope-Tightening Devices, of which the following is a specification.

The object of this invention is to construct a device for tightening a rope used in the transmission of power.

In the accompanying drawings, Figure 1 is a side elevation of my improved device. Fig. 2 is a similar view of the device in which the rope is tightened. Fig. 3 is an end elevation of rope, showing its connection with the driver and driven pulleys. Fig. 4 is a section of one of the arms and a roller.

The driver 1 is a pulley of the usual construction, and the driven is a sectional pulley mounted on a shaft 2. One section is secured to the shaft and is composed of the head 3 and arms 4, equally spaced. Each arm supports a cone-shaped roller 5 in a manner to revolve on a radial axis. A movable section is mounted on the shaft and is composed of the head 6 and radial arms 7, equally spaced and each arm supporting a cone-shaped roller 8 in a manner to revolve on a radial axis. The head 6 has an annular groove 9, and a shipping-lever 10 has an engagement with the groove. The arms of the two sections interlock and the movable section is slidable on the shaft 2, and by means of the shipping-lever the rollers of the movable section may be moved nearer the line with the roller of the other section. A rope 11, located around the driver 1, is also located around the driven pulley between the two rows of cone-shaped rollers, as shown at Figs. 1 and 3. In Fig. 3 it will be noticed that the rope hangs free of the driver on the under side. Consequently the rope is not moving.

In Fig. 2 the movable head is moved toward the other head, which brings the two sets of rollers nearer in line and forms kinks in the rope, which will shorten it and bring it in contact with the driver, thereby imparting a rotary motion to the driven pulley, and the greater the kinks the tighter will the rope be and more power transmitted, and by means of the shipping-lever the power transmitted to the driven pulley may be gradually increased until all of the power is used. This is a form of friction-clutch in which rope transmission is used.

Fig. 4 is a section of one of the rollers 8, showing the radial axis 12, upon which the roller revolves.

I claim as my invention—

1. In rope or cable transmission, the combination of two sections, one secured to a shaft and the other section movable thereon, each section supporting rollers revoluble on radial axes.

2. In rope or cable transmission, the combination of two sections, one section secured to a shaft and the other section movable thereon, each section having arms, and the arms of one section interlocking with the arms of the other section, and the arms of both sections supporting rollers revoluble on radial axes.

3. In rope or cable transmission, the combination of two sections, one section secured to a shaft and the other section movable thereon, each section supporting cone-shaped rollers revoluble on radial axes.

ADOLPH PFUND.

Witnesses:
A. O. BEHEL,
E. BEHEL.